United States Patent
Huang et al.

(10) Patent No.: US 11,493,944 B2
(45) Date of Patent: Nov. 8, 2022

(54) ELECTRONIC DEVICE SYSTEM AND POWER DELIVERY METHOD

(71) Applicant: Realtek Semiconductor Corp., HsinChu (TW)

(72) Inventors: Yueh-Hsing Huang, HsinChu (TW); Sen-Huang Tang, HsinChu (TW); Wu-Chih Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/392,275

(22) Filed: Aug. 3, 2021

(65) Prior Publication Data
US 2022/0171415 A1 Jun. 2, 2022

(30) Foreign Application Priority Data
Dec. 1, 2020 (TW) .................................. 109142150

(51) Int. Cl.
*G05F 1/46* (2006.01)
(52) U.S. Cl.
CPC ..................................... *G05F 1/46* (2013.01)
(58) Field of Classification Search
None
See application file for complete search history.

(56) References Cited

U.S. PATENT DOCUMENTS

| | | | | |
|---|---|---|---|---|
| 5,930,496 | A * | 7/1999 | MacLaren | G06F 13/4072 439/55 |
| 8,294,307 | B2 * | 10/2012 | Tsai | G06F 1/266 307/150 |
| 10,176,780 | B2 * | 1/2019 | Wang | G09G 5/006 |
| 10,191,525 | B2 * | 1/2019 | Leigh | G06F 1/3275 |
| 10,310,578 | B2 * | 6/2019 | Alou | G09G 5/008 |
| 10,511,798 | B2 * | 12/2019 | Park | H02J 7/00036 |
| 10,802,564 | B2 * | 10/2020 | Yang | H02H 9/004 |
| 10,868,624 | B2 * | 12/2020 | Shintani | G02B 6/4416 |
| 2009/0083825 | A1 * | 3/2009 | Miller | G09G 5/006 725/151 |
| 2014/0327833 | A1 * | 11/2014 | Kabuto | H04N 21/4432 348/730 |
| 2022/0140732 | A1 * | 5/2022 | Cheng | H02M 3/1582 323/284 |

* cited by examiner

*Primary Examiner* — Thomas J. Hiltunen
(74) *Attorney, Agent, or Firm* — Winston Hsu

(57) ABSTRACT

An electronic device system includes a first electronic device and a power delivery device. The first electronic device is arranged to selectively provide multiple power signals. The power delivery device is arranged to deliver one or more of the power signals. The power signals at least include a first power signal and a second power signal. When the first electronic device detects that the power delivery device is connected to the first electronic device and before a hot plug notification signal is received, the first electronic device provides only the first power signal to the power delivery device. After the first electronic device has received the hot plug notification signal, the first electronic device provides both the first power signal and the second power signal to the power delivery device.

14 Claims, 2 Drawing Sheets

ELECTRONIC DEVICE SYSTEM AND POWER DELIVERY METHOD

BACKGROUND OF THE INVENTION

1. Field of the Invention

The invention relates to a power delivery method and an electronic device system implementing the power delivery method, more particularly to a multi-power delivery method and the corresponding electronic device system.

2. Description of the Prior Art

Electronic devices usually obtain the required power through power lines or cables. However, the existing power lines and cables are all designed for single power supply and have no special power delivery mechanism. For example, when a power line or cable is connected to a power source, the power source will directly provide power onto the power line or cable without confirming whether a power sink device is already connected to the power line or cable. If the power source starts to supply power or voltage when two terminals of the power line or cable have not been stably connected to the corresponding devices, dangerous situation may occur.

In view of this, there is a need for a power delivery method and an electronic device system implementing the power delivery method, in particular, a multi-power delivery method and the corresponding electronic device system for safely delivering multiple power signals by using the same power line or cable.

SUMMARY OF THE INVENTION

It is an objective of the invention to provide a power delivery method and a corresponding electronic device system implementing the power delivery method for safely delivering multiple power signals by using the same power line or cable, so as to avoid the aforementioned dangerous situation to occur.

According to an embodiment of the invention, an electronic device system includes a first electronic device and a power delivery device. The first electronic device is arranged to selectively provide multiple power signals. The power delivery device is arranged to deliver one or more of the power signals. The power signals at least include a first power signal and a second power signal. When the first electronic device detects that the power delivery device is connected to the first electronic device and before a hot plug notification signal is received, the first electronic device provides only the first power signal to the power delivery device. After the first electronic device has received the hot plug notification signal, the first electronic device provides both the first power signal and the second power signal to the power delivery device.

According to another embodiment of the invention, a power delivery method for delivering one or more of a plurality of power signals through a power delivery device is provided. The power signals comprise at least a first power signal and a second power signal and the power delivery method comprises: outputting the first power signal to the power delivery device and detecting whether a hot plug notification signal is received by a first electronic device coupled to the power delivery device, wherein before receiving the hot plug notification signal, the second power signal is not outputted by the first electronic device; and outputting both the first power signal and the second power signal to the power delivery device by the first electronic device after the first electronic device has received the hot plug notification signal through the power delivery device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
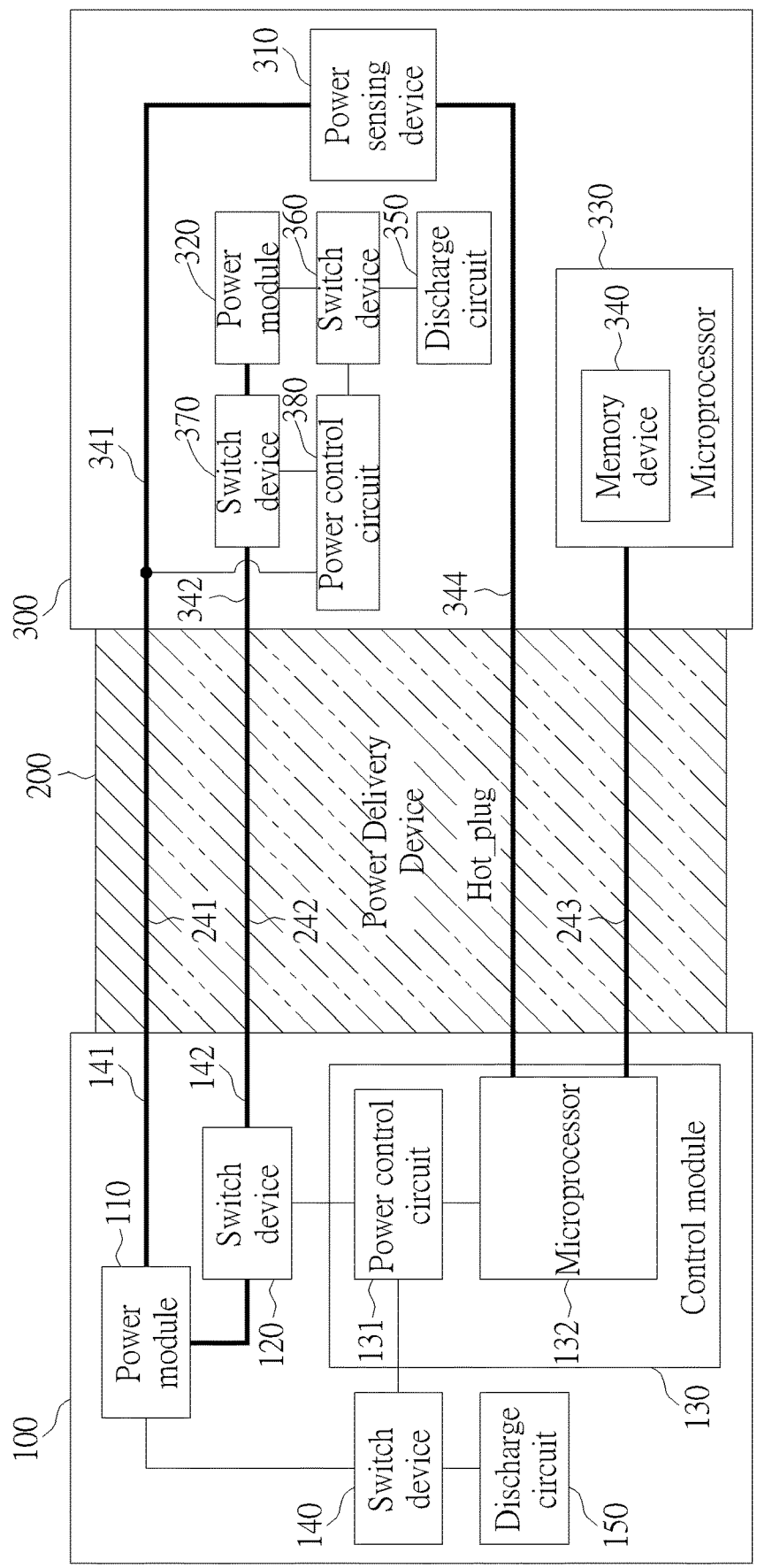
FIG. 1 illustrates a block diagram of an electronic device system according to an embodiment of the invention.

FIG. 1 illustrates a block diagram of an electronic device system according to an embodiment of the invention. The electronic device system may comprise a first electronic device 100, a power delivery device 200 and a second electronic device 300. In an embodiment of the invention, the first electronic device 100 may act as a power source (that is, a power supplier) of the second electronic device 300 for outputting power signals, and may also act as a signal source for outputting at least one signal (for example, a video signal, an audio signal, etc.). The second electronic device 300 (that is, a power sink device) may receive the power signals and/or other signals (for example, the video signal, the audio signal, etc.) provided by the first electronic device 100 through the power delivery device 200.

According to an embodiment of the invention, the first electronic device 100 may be a player, and the player may be implemented by, for example, but not limited to, a set-top box (STB). The second electronic device 300 may be a display device, and the display device may be implemented by, for example, but not limited to, an electronic product such as a display panel, a screen, or a digital television.

The power delivery device 200 may be a pluggable or removable physical device coupled between the first electronic device 100 and the second electronic device 300, and is arranged to transmit or deliver power signals, current signals, voltage signals, video signals, audio signals, or any communication signals generated in compliance with any communication protocol between the first electronic device 100 and the second electronic device 300. In an embodiment of the invention, the power delivery device 200 may be a power line or cable, and the power line or cable may be the power line or cable implemented in compliance with any existing specifications, for example but not limited to, the High Definition Multimedia Interface (HDMI) specifications or Universal Serial Bus (USB) specifications, or may be the power line or cable implemented in compliance with other special specifications (for example, a dedicated product specification defined by a product manufacturer).

It is to be noted that FIG. 1 is a simplified block diagram of an electronic device system, in which the power delivery device 200 is represented by a line. However, the proposed power delivery device 200 is not limited to the shape as shown in the figures. For example, the power delivery device 200 may actually comprise one or more of connectors or plugs used to connect the first electronic device 100 and the second electronic device 300 and a transmission line used to transmit signals. In addition, it is to be noted that FIG. 1 presents a simplified block diagram in which only the components relevant to the invention are shown. As will be readily appreciated by a person of ordinary skill in the art, each electronic device (including the power delivery device 200) may further comprise other components not shown in FIG. 1 and arranged to implement the required signal processing functionalities. In addition, it is to be noted that FIG. 1 is illustrated by way of example and the drawings are not necessarily drawn to scale.

In an embodiment of the invention, the first electronic device 100 is capable of providing a plurality of power signals and the power delivery device 200 is capable of delivering the plurality of power signals, wherein the power signals may at least comprise a first power signal and a second power signal. For example, in an embodiment of the invention, the first power signal may be a low power signal having a standard voltage level, such as a 5 volt or 12 volt power signal, and the second power signal may be a high power signal having a relative high voltage level, for example, a 390 volt power signal. The first electronic device 100, the second electronic device 300 and the power delivery device 200 may respectively comprise a plurality of power lines, for example, the power lines 141 and 142, the power lines 341 and 342, and the power lines 241 and 242. Each power line is arranged to deliver a power signal.

According to an embodiment of the invention, the first electronic device 100 may be arranged to selectively provide one or more of the plurality of power signals to the power delivery device 200 according to the status of a connection between the power delivery device 200 and a power sink device. In the initial state, that is, when the first electronic device 100 has not detected that the power sink device has been stably connected to the power delivery device 200 and/or has not determined that the power sink device is capable of receiving the second power signal, the first electronic device 100 will limit the supply of the second power signal. When the first electronic device 100 detected that the power sink device has been stably connected to the power delivery device 200 or further determined that the power sink device is capable of receiving the second power signal, the first electronic device 100 may start to supply both the first power signal and the second power signal at the same time.

To be more specific, when the first electronic device 100 detected that the power delivery device 200 is connected to the first electronic device 100 and before the first electronic device 100 further receives a hot plug notification signal HOT_PLUG, the first electronic device 100 may only provide or output the first power signal to the power delivery device 200 through the corresponding power line, for example, the power line 141. Therefore, at this time, the power delivery device 200 may only transmit the first power signal through the corresponding power line, for example, the power line 241. When the first electronic device 100 has received the hot plug notification signal HOT_PLUG, (or in some embodiments, the condition may further comprise that when the first electronic device 100 has determined that the power sink device is an electronic device that is allowed to be used in the electronic device system, which will be described in more detailed in the following paragraphs), the first electronic device 100 may output both the first power signal and the second power signal at the same time. Therefore, the first power signal and the second power signal may both be output to the power delivery device 200 at the same time through the corresponding power lines.

Referring to FIG. 1, the first electronic device 100 may comprise a power module 110, switch devices 120 and 140, a control module 130 and a discharge circuit 150. The power module 110 is arranged to generate the power signals. The power module 110 may be connected to the power lines of the power delivery device 200 through the power lines inside of the first electronic device 100 and is arranged to deliver the power signals through the corresponding power lines. The switch device 120 may be coupled to the power line, such as the power line 142 which is arranged to transmit the second power signal, inside of the first electronic device 100, and the power line 142 may be further coupled to the power line, such as the power line 242 which is arranged to transmit the second power signal, inside of the power delivery device 200. The status of connection between the power module 110 and the power line 142 is controlled by the switch device 120. In other words, in the embodiments of the invention, the delivery of the second power signal is controlled by the switch device 120. The switch device 140 may be coupled to the discharge circuit 150, and the status of connection between the discharge circuit 150 and the power module 110 is controlled by the switch device 140. The discharge circuit 150 is arranged to discharge the charge stored in the power module 110 (for example, the charge stored in the capacitor). In the embodiment of the invention, the control module 130 may be coupled to the switch devices 120 and 140 for controlling the switch devices 120 and 140.

The control module 130 may comprise a power control circuit 131 and a microprocessor 132. The power control circuit 131 may be coupled to the switch devices 120 and 140 for controlling the on/off status of the switch devices 120 and 140 according to instructions from the microprocessor 132. In the initial state, that is, when the first electronic device 100 has not detected that the power sink device has been stably connected to the power delivery device 200 and/or has not determined that the power sink device is capable of receiving the second power signal, under the control of the power control circuit 131, the status of the switch device 120 is "opened", so the first electronic device 100 will not output the second power signal to the power delivery device 200. In addition, at this time, under the control of the power control circuit 131, the status of the switch device 140 is "closed", so that the discharge circuit 150 is connected to the power module 110.

The second electronic device 300 may comprise a power sensing device 310, a power module 320, a microprocessor 330, a discharge circuit 350, switch devices 360 and 370, and a power control circuit 380. The power sensing device 310 may be coupled to the power line 241 of the power delivery device 200 through a power line inside of the second electronic device 300, such as the power line 341, and is arranged to receive and sense the first power signal. When the power delivery device 200 is connected to the second electronic device 300, the power sensing device 310 is arranged to generate the hot plug notification signal HOT_PLUG according to the first power signal, for example, the power sensing device 310 may generate the hot plug notification signal HOT_PLUG having a high voltage level. The power sensing device 310 may be further coupled to a signal transmission line inside of the power delivery device 200 through a signal transmission line inside the second electronic device 300, such as the signal transmission line 344, so that the hot plug notification signal HOT_PLUG may be output through the power delivery device 200. According to an embodiment of the invention, the power sensing device 310 is a resistor.

The power module 320 may be coupled to the power line, such as the power line 242, which is arranged to receive special power signal, such as the aforementioned second power signal, inside of the power delivery device 200 through the power line inside the second electronic device 300, such as the power line 342. The microprocessor 330 may comprise a memory device 340 arranged to store information regarding at least one of an attribute of the second electronic device 300 and a power requirement of the second electronic device 300. It is to be noted that, in some embodiments of the invention, the second electronic device 300 may also not comprising a microprocessor and comprise only a memory device for storing information regarding at least one of an attribute of the second electronic device 300 and a power requirement of the second electronic device 300.

The discharge circuit 350 is arranged to discharge the charge stored in the power module 320 (for example, the charge stored in the capacitor). The switch device 360 may be coupled between the power module 320 and the discharge circuit 350, and the status of connection between the power module 320 and the discharge circuit 350 is controlled by the switch device 360. The switch device 370 may be coupled between the power module 320 and the power line 342, and the status of connection between the power module 320 and the power line 342 is controlled by the switch device 370. The power control circuit 380 may be coupled to the switch devices 360 and 370 for controlling the switch devices 360 and 370 according to instructions from the microprocessor 330. It is to be noted that in the embodiment where the second electronic device 300 does not comprise a microprocessor, the power control circuit 380 may also control the switch devices 360 and 370 according to the determination or computation result made by its internal logic circuit.

In a default state of the second electronic device 300, for example, when the first power signal has not been received, under the control of the power control circuit 380, the status of the switch device 370 is "opened", so that the power module 320 and the power line 342 is disconnected, and the status of the switch device 360 is "closed", so that the discharge circuit 350 is connected to the power module 320. When the second electronic device 300 has received the first power signal, the power control circuit 380 may switch the status of the switch device 370 to be "closed" in response to the first power signal, so that the power module 320 is connected to the power line 342 and the status of the switch device 360 is switched to be "opened", so that the discharge circuit 350 is disconnected from the power module 320.

In the embodiments of the invention, a signal level of the hot plug notification signal HOT_PLUG may indicate the status of a connection between the second electronic device 300 and the power delivery device 200. For example, when the second electronic device 300 is connected to the power delivery device 200, the signal level of the hot plug notification signal HOT_PLUG may be changed from a low level (e.g., a low voltage level) to a high level (e.g., a high voltage level). When the microprocessor 132 receives the hot plug notification signal HOT_PLUG, for example, when detecting that the signal level of the hot plug notification signal HOT_PLUG changes from a low level to a high level, the first electronic device 100 may determine that the power sink device, such as the second electronic device 300, has been stably connected to the power delivery device 200. In some embodiments, the microprocessor 132 may issue a corresponding power output command to the power control circuit 131. In response to the power output command, the power control circuit 131 may switch the status of the switch device 120 to be "closed". At this time, the first electronic device 100 may output the second power signal to the power delivery device 200. In addition, at this time, the power control circuit 131 may also control the status of the switch device 140 to be "opened" in response to the power output command, so that the discharge circuit 150 is disconnected from the power module 110.

In some other embodiments, after the first electronic device 100 has received the hot plug notification signal HOT_PLUG, the microprocessor 132 may further communicate with the microprocessor 330 of the second electronic device 300 through a predetermined interface, such as the interface 243 comprised in the power delivery device 200, to obtain information regarding at least one of an attribute of the second electronic device 300 and a power requirement of the second electronic device 300. The interface 243 may be, for example, an Inter-Integrated Circuit (I$^2$C) or a Serial Peripheral Interface Bus (SPI). Alternatively, in an embodiment where the second electronic device 300 does not comprise a microprocessor, the microprocessor 132 may directly read the memory device inside of the second electronic device 300 through the predetermined interface to obtain the information. The microprocessor 132 may determine whether the second electronic device 300 is an electronic device allowed to be used in the electronic device system according to the obtained information.

According to an embodiment of the invention, the information regarding an attribute of the second electronic device 300 may comprise information regarding a product identification code, a manufacturer identification code, or the likes of the second electronic device 300. The microprocessor 132 may pair with the second electronic device 300 through the interface 243 according to this information to determine whether the second electronic device 300 is identifiable, or is an electronic device that has been authorized or authenticated and is allowed to be used in the electronic device system. In addition, the microprocessor 132 may further determine parameters regarding the current, voltage or power of the second electronic device 300 based on the information regarding the power requirement of the second electronic device 300, for example, the maximum tolerable current, voltage or power and/or other related parameters. When the microprocessor 132 determines that the second electronic device 300 is an identifiable, authorized or authenticated electronic device, and/or determines that the power signals output by the first electronic device 100 is able to satisfy the power requirement of the second electronic device 300, the microprocessor 132 may determine that the second electronic device 300 is an electronic device allowed to be used in the electronic device system.

According to some embodiments of the invention, the microprocessor 132 may issue the corresponding power output command to the power control circuit 131 so as to provide the second power signal to the power delivery device 200 and to disconnect the discharge circuit 150 from the power module 110 after determining that the second electronic device 300 is an electronic device allowed to be used in this electronic device system.

Figure 2:
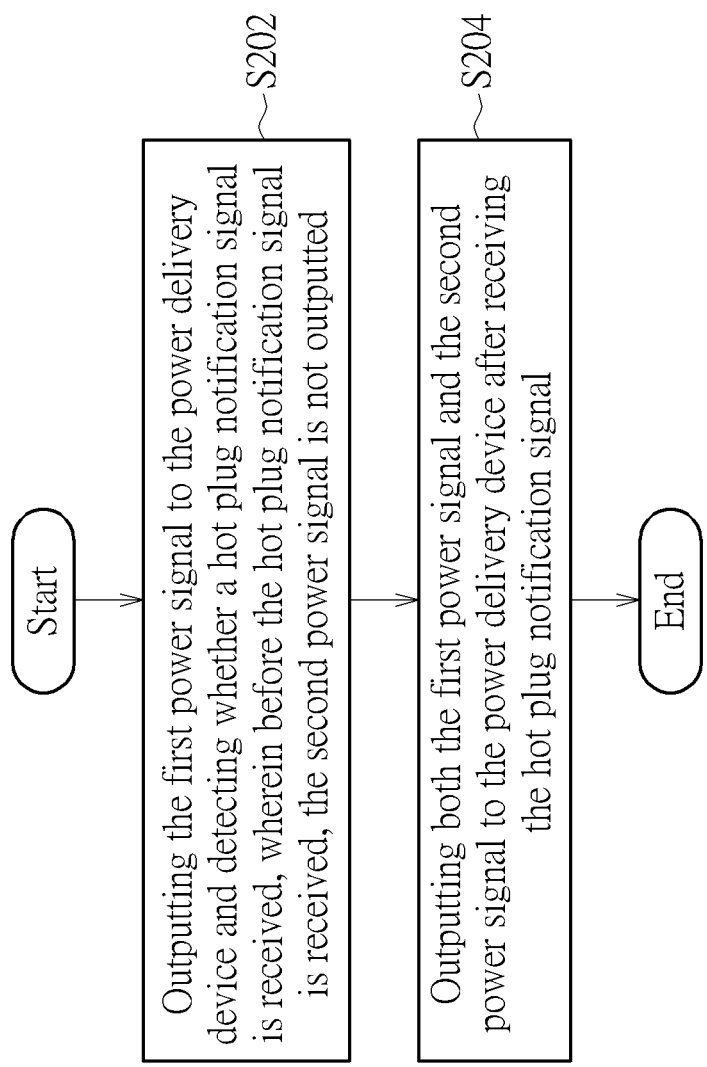
FIG. 2 illustrates an exemplary flow chart a power delivery method according to an embodiment of the invention.

FIG. 2 illustrates an exemplary flow chart a power delivery method according to an embodiment of the invention. The power delivery method is performed by the first electronic device 100 coupled to the power delivery device 200 and being capable of providing a plurality of power signals in the electronic device system, and may comprise the following steps:

Step S202: outputting the first power signal to the power delivery device 200 and detecting whether a hot plug notification signal is received, wherein before receiving the hot plug notification signal, the second power signal is not outputted by the first electronic device 100.

Step S204: outputting both the first power signal and the second power signal to the power delivery device 200 after receiving the hot plug notification signal through the power delivery device 200.

In order to safely use the power delivery device 200 to deliver multiple power signals, especially the aforementioned second power signal with a relatively high voltage level, the first electronic device 100 may continuously monitor the connection status of the power delivery device 200 and the power sink device, and the first electronic device 100 may stop outputting the second power signal when determining that the power delivery device 200 is disconnected from the power sink device. For example, the power control circuit 131 of the first electronic device 100 may switch the status of the switch device 120 to be "opened", so that the first electronic device 100 will not output the second power signal to the power delivery device 200, and switch the status of the switch device 140 to be "closed", so that the discharge circuit 150 is connected to the power module 110.

According to some embodiments of the invention, the determination of whether the power delivery device 200 is disconnected from the power sink device may be made based on the signal level of the hot plug notification signal HOT_PLUG. As described above, the first electronic device 100 may determine the connection status between the power delivery device 200 and the power sink device according to the signal level of the hot plug notification signal HOT_PLUG.

To be more specific, the first electronic device 100 may continuously monitor the signal level of the hot plug notification signal HOT_PLUG. When the hot plug notification signal HOT_PLUG changes from a high level to a low level, the first electronic device 100 may thereby determine that the power sink device, such as the second electronic device 300, is disconnected from the power deliver device 200.

In the embodiment in which the first electronic device 100 communicates with the power sink device through the interface 243, the determination of whether the power delivery device 200 is disconnected from the power sink device may be made further based on the reception result of one or more response signals from the power sink device. The first electronic device 100 may determine the connection status between the power delivery device 200 and the power sink device according to the reception result of one or more response signals that is supposed to be transmitted by the power sink device during the communication process.

To be more specific, the first electronic device 100 may send one or more signals to the power sink device during the communication process and receive one or more signals from the power sink device, including the acknowledgment signal for responding to the first electronic device 100. When the first electronic device 100 has not received any response signal that is supposed to be received from the power sink device, such as the second electronic device 300, within a predetermined period, the first electronic device 100 may determine that the power delivery device 200 has been disconnected from the second electronic device 300.

After determining that the power delivery device 200 has been disconnected from the power sink device, the first electronic device 100 may stop outputting the second power signal. The first electronic device 100 does not output the second power signal until the hot plug notification signal HOT_PLUG is received again, or until the hot plug notification signal HOT_PLUG is received again and the power sink device is determined as an electronic device that is allowed to be used in this electronic device system (including that the power sink device is determined as being capable of receiving the second power signal).

On the other hand, in one embodiment of the invention, for the second electronic device 300 being able to safely receive multiple power signals through the power delivery device 200, when the power control circuit 380 detects that the second electronic device 300 no longer receives the first power signal, the status of the switch device 370 may to be switched to be "opened", so that the power module 320 is disconnected from the power line 342, and the status of the switch device 360 may be switched to be "closed", so that the discharge circuit 350 is connected to the power module 320.

In summary, with the proposed power delivery method, the power source will provide special power to the power delivery device only when it detects that the power sink device has been stably connected to the power deliver device and/or determines that the power sink device has the ability to receive special power. When it is determined that the power sink device is disconnected from the power delivery device, no special power is output by the power source, thereby ensuring that the power delivery device 200 can safely transmit multiple power signals in the electronic device system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device system, comprising:
  a first electronic device, arranged to selectively provide a plurality of power signals; and
  a power delivery device, arranged to deliver one or more of the power signals,
  wherein the power signals at least comprise a first power signal and a second power signal, when the first electronic device detects that the power delivery device is connected to the first electronic device and before a hot plug notification signal is received, the first electronic device is arranged to provide only the first power signal to the power delivery device, and
  after the first electronic device has received the hot plug notification signal through the power delivery device, the first electronic device provides both the first power signal and the second power signal to the power delivery device,
  wherein the first electronic device comprises:
  a power module, arranged to generate the power signals, wherein the power module is coupled to a plurality of power lines, the power lines comprise at least a first power line and a second power line, the first power line is arranged to deliver the first power signal and the second power line is arranged to deliver the second power signal;
  a switch device, coupled to the second power line, wherein delivery of the second power signal is controlled by the switch device; and
  a control module, coupled to the switch device and arranged to control the switch device.

2. The electronic device system of claim 1, further comprising:
  a second electronic device, comprising a power sensing device arranged to sense the first power signal, wherein when the power delivery device is connected to the second electronic device, the power sensing device is arranged to generate the hot plug notification signal according to the first power signal.

3. The electronic device system of claim 2, wherein the power sensing device is a resistor.

4. The electronic device system of claim 2, wherein after receiving the hot plug notification signal, the first electronic device is further arranged to communicate with the second electronic device via a predetermined interface to obtain information regarding at least one of an attribute of the second electronic device and a power requirement of the second electronic device, and determine whether the second electronic device is an electronic device allowed to be used in the electronic device system according to the obtained information, wherein the first electronic device is arranged to provide the second power signal to the power delivery device after determining that the second electronic device is an electronic device allowed to be used in the electronic device system.

5. The electronic device system of claim 4, wherein the second electronic device comprises a memory device arranged to store the information, and the first electronic device is arranged to read the memory device via the predetermined interface to obtain the information.

6. The electronic device system of claim 2, wherein the first electronic device is further arranged to determine whether the second electronic device is disconnected from the power delivery device and when determining that second electronic device is disconnected from the power delivery device, the first electronic device does not provide the second power signal to the power delivery device.

7. The electronic device system of claim 6, wherein the first electronic device determines whether the second electronic device is disconnected from the power delivery device based on a signal level of the hot plug notification signal.

8. The electronic device system of claim 6, wherein the first electronic device determines whether the second electronic device is disconnected from the power delivery device based on a reception result of one or more response signals from the second electronic device, and when the first electronic device has not received any response signal from the second electronic device within a predetermined period, the first electronic device determines that the second electronic device is disconnected from the power delivery device.

9. The electronic device system of claim 1, further comprising:
a second electronic device, comprising:
a power sensing device, arranged to sense the first power signal, wherein when the power delivery device is connected to the second electronic device, the power sensing device is arranged to generate the hot plug notification signal according to the first power signal; and
a microprocessor, comprising a memory device storing information regarding at least one of an attribute of the second electronic device and a power requirement of the second electronic device, wherein the control module of the first electronic device is arranged to communicate with the microprocessor through a predetermined interface to obtain the information and determine whether the second electronic device is an electronic device allowed to be used in the electronic device system, and
wherein the first electronic device is arranged to provide the second power signal to the power delivery device after determining that the second electronic device is an electronic device allowed to be used in the electronic device system.

10. A power delivery method for delivering one or more of a plurality of power signals through a power delivery device, wherein the power signals comprise at least a first power signal and a second power signal, and the power delivery method comprises:
outputting the first power signal to the power delivery device and detecting whether a hot plug notification signal is received by a first electronic device coupled to the power delivery device, wherein before receiving the hot plug notification signal, the second power signal is not outputted by the first electronic device;
receiving the first power signal from the power delivery device and generating the hot plug notification signal according to the first power signal by a second electronic device; and
outputting both the first power signal and the second power signal to the power delivery device by the first electronic device after the first electronic device has received the hot plug notification signal through the power delivery device,
wherein step of outputting both the first power signal and the second power signal to the power delivery device by the first electronic device after the first electronic device has received the hot plug notification signal through the power delivery device further comprises:
obtaining information regarding at least one of an attribute of the second electronic device and a power requirement of the second electronic device by the first electronic device after receiving the hot plug notification signal; and
determining whether the second electronic device is an electronic device allowed to be used in an electronic device system by the first electronic device according to the obtained information,
wherein the second power signal is output by the first electronic device after determining that the second electronic device is an electronic device allowed to be used in the electronic device system.

11. The power delivery method of claim 10, wherein the hot plug notification signal is generated by a resistor of the second electronic device.

12. The power delivery method of claim 10, further comprising:
determining whether the second electronic device is disconnected from the power delivery device by the first electronic device; and
when determining that second electronic device is disconnected from the power delivery device, stop outputting the second power signal by the first electronic device.

13. The power delivery method of claim 12, wherein whether the second electronic device is disconnected from the power delivery device is determined based on a signal level of the hot plug notification signal.

14. The power delivery method of claim 12, wherein whether the second electronic device is disconnected from the power delivery device is determined based on a reception result of one or more response signals from the second electronic device, and when the first electronic device has not received any response signal from the second electronic device within a predetermined period, it is determined that second electronic device is disconnected from the power delivery device.

* * * * *